(12) United States Patent
Hilton

(10) Patent No.: US 8,965,354 B2
(45) Date of Patent: *Feb. 24, 2015

(54) PLAYBACK PAUSE BEFORE SIGNAL LOSS OF A MOBILE DEVICE

(71) Applicant: Eldon Technology Limited, Steeton (GB)

(72) Inventor: David Gareth Hilton, Huddersfield (GB)

(73) Assignee: Eldon Technology Limited, Steeton, Keighley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,648

(22) Filed: Nov. 5, 2013

(65) Prior Publication Data

US 2014/0066042 A1    Mar. 6, 2014

Related U.S. Application Data

(63) Continuation of application No. 12/981,272, filed on Dec. 29, 2010, now Pat. No. 8,655,335.

(51) Int. Cl.

| | |
|---|---|
| *H04M 3/00* | (2006.01) |
| *H04W 4/02* | (2009.01) |
| *G01S 19/14* | (2010.01) |
| *G01S 19/42* | (2010.01) |
| *H04L 29/06* | (2006.01) |
| *H04W 28/04* | (2009.01) |
| *H04W 64/00* | (2009.01) |

(52) U.S. Cl.
CPC .......... *H04W 4/02* (2013.01); *G01S 19/14* (2013.01); *G01S 19/42* (2013.01); *H04W 4/021* (2013.01); *H04L 65/1083* (2013.01); *H04L 65/4084* (2013.01); *H04L 65/80* (2013.01); *H04W 28/04* (2013.01); *H04W 64/00* (2013.01)
USPC .......... 455/418; 455/419; 455/421; 455/456.1

(58) Field of Classification Search
None
See application file for complete search history.

(56) References Cited

U.S. PATENT DOCUMENTS

| | | | |
|---|---|---|---|
| 2008/0104653 | A1 | 5/2008 | Kim |
| 2008/0248832 | A1* | 10/2008 | Kim et al. ............... 455/556.1 |
| 2009/0009589 | A1 | 1/2009 | Kim et al. |
| 2010/0203823 | A1 | 8/2010 | Apaar |
| 2011/0039506 | A1 | 2/2011 | Lindahl et al. |
| 2012/0108264 | A1 | 5/2012 | Martz et al. |

OTHER PUBLICATIONS

U.S. Appl. No. 12/344,359, filed Dec. 26, 2008, titled "Systems and Methods for Determining User Position Via Wireless Signal Characteristics."

* cited by examiner

*Primary Examiner* — Suhail Khan
(74) *Attorney, Agent, or Firm* — Kilpatrick Townsend & Stockon LLP

(57) ABSTRACT

One embodiment described herein may take the form of a system and/or method for monitoring a position of a mobile device and pausing play or recording a multimedia presentation when the mobile device enters or approaches a zone where a wireless signal may be degraded or lost. In one embodiment, the mobile device may utilize a global position system (GPS) signal to determine the location of the mobile device. Further, the mobile device may be configured to display one or more multimedia presentations and may, in response to the mobile device being located near or within a dark zone, pause play of the multimedia presentation until the mobile device returns to a zone of sufficient wireless signal coverage. In this manner, the mobile device may prevent the user from losing or missing portions of the multimedia presentation due to lost or degraded wireless signal of the mobile device.

20 Claims, 5 Drawing Sheets

PLAYBACK PAUSE BEFORE SIGNAL LOSS OF A MOBILE DEVICE

CROSS REFERENCES

This continuation application claims priority to U.S. patent application Ser. No. 12/981,272, filed on Dec. 29, 2010, entitled "PLAYBACK PAUSE BEFORE SIGNAL LOSS OF A MOBILE DEVICE", which is hereby incorporated by reference, as if set forth in full in this document, for all purposes.

TECHNICAL FIELD

Embodiments disclosed herein relate generally to providing multimedia content provided over a distribution system, and more particularly to ceasing display of a multimedia presentation on a mobile device in anticipation of signal loss by the mobile device.

BACKGROUND

Many multimedia presentation distribution systems provide the capability of viewing said multimedia presentations on one or more mobile devices. For example, many cellular smartphones and similar handheld devices allow a user of the device to view multimedia presentations, such as a television program, on the display device of the phone. In general, these programs may be provided to the handheld device over a wireless network and displayed to the user upon receipt at the device. However, because the multimedia presentations are generally transmitted to the handheld devices over a wireless network, interruptions in the presentation may occur if the wireless signal at the handheld device is lost or drops below a certain level. In those zones where the wireless signal is degraded or non-existent, at least a portion of the multimedia presentation may fail to be displayed on the handheld device such that the user may miss part or all of the presentation due to the degraded signal.

BRIEF SUMMARY

One implementation may take the form of a method for displaying a multimedia presentation on a mobile device. The method may comprise the operations of monitoring the location of a mobile device, comparing the monitored location of the mobile device to a database of one or more locations of potential degraded signal to determine degradation of signal of the mobile device and transmitting a first control signal when it is determined that the mobile device is near at least one of the one more locations. In addition, the first control signal may pause the display of a multimedia presentation on a display of the mobile device.

Another implementation may take the form of a system for distributing a multimedia presentation to a mobile device. The system may comprise a receiver configured to receive one or more multimedia presentations from a source and a repeater device configured to transmit at least one of the one or more multimedia presentations to a mobile device over a network. The repeater device may be further configured to receive a first control signal from the mobile device indicating that the mobile device is near a location of potential degraded signal. In addition, in response to the first control signal, the repeater device may instruct the receiver to record a portion of the at least one of the one or more multimedia presentations.

Yet another implementation may take the form of a method for pausing transmission of a multimedia presentation to a mobile device. The method may comprise the operations of monitoring a received wireless signal strength at the mobile device and storing one or more locations wherein the received signal strength is below a predetermined threshold signal value into a database of one or more locations of dark zones. Further, the method may include the operations of monitoring a location of the mobile device, comparing the monitored location of the mobile device to the database to anticipate a potential degradation of signal of the mobile device and transmitting a first control signal when it is determined that the mobile device is near at least one of the one more locations stored in the database. In addition, the first control signal may pause the transmission of the multimedia presentation to the mobile device.

DETAILED DESCRIPTION

One embodiment described herein may take the form of a system and/or method for monitoring a position of a mobile device and pausing play or recording a multimedia presentation when the mobile device enters or approaches a zone where a wireless signal may be degraded or lost. In one embodiment, the mobile device may utilize a global position system (GPS) signal to determine the location of the mobile device. In addition, the mobile device, multimedia distribution system and/or an associated server or other computing device may maintain a database of locations defining one or more zones of degraded or lost wireless signal (referred to herein as "dark zones") so that the mobile device may compare the dark zone database with the mobile device's GPS location to determine if the mobile device is located near or within a dark zone. Further, the mobile device may be configured to display one or more multimedia presentations and may, in response to the mobile device being located near or within a dark zone, pause streaming or other playing of the multimedia presentation until the mobile device returns to an area having sufficient wireless signal strength to support streaming of the presentation at a desired quality. In this manner, the mobile device may prevent the user from losing or missing portions of the multimedia presentation due to lost or degraded wireless signal of the mobile device.

In addition, the mobile device may be in communication with an electronic component of the distribution system that may be configured to record or otherwise store one or more multimedia presentations. In this example, the mobile device may transmit a signal to the electronic device with the stored presentations indicating that the presentation displayed on the mobile device may be interrupted when in a dark zone. In response, the electronic device may begin recording the multimedia presentation being displayed on the mobile device such that, when the mobile device again receives a sufficient wireless signal, the electronic device may provide the recorded portion of the multimedia presentation to the mobile device for display to a user of the mobile device. In this manner, the entire multimedia presentation may be provided to the mobile device for display to the user despite the mobile device entering dark zones where wireless signal is lost. Finally, in either embodiment, the mobile device may update or maintain the database of dark zones by monitoring the strength of the wireless signal received by the mobile device and the GPS position of the mobile device and noting any dark zones encountered.

Figure 1:
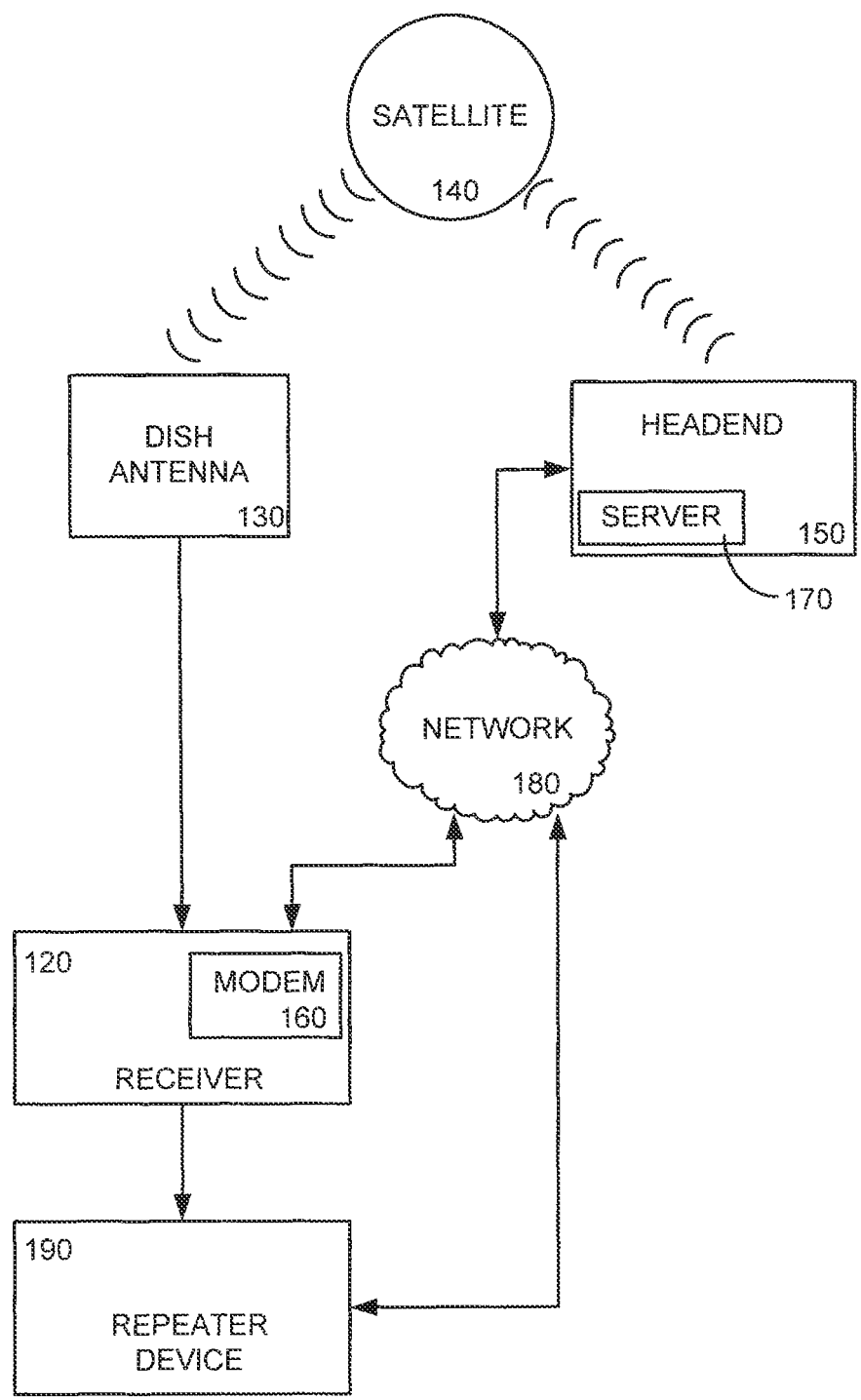
FIG. 1 depicts an exemplary satellite distribution system that may utilize a first embodiment to provide one or more multimedia presentations for display to a user, including providing the one or more multimedia presentations to a repeater device for broadcast to a mobile device for display.

FIG. 1 depicts an exemplary satellite distribution system that may utilize a first embodiment to provide one or more multimedia presentations for display to a user, including providing the one or more multimedia presentations to a repeater device for broadcast to a mobile device for display. The satellite system of FIG. 1 is but one example of a system that may provide multimedia presentations for display on a display device or mobile device. Alternatively, a digital cable system or any other system may also utilize the embodiments described herein. Further, it should be appreciated that the system may include more or fewer components than described herein and such components may be interconnected in any manner. Additionally any type of signal may be communicated by the system, such as a video signal, an audio signal, an interactive signal, other signal types and any of various combinations and/or permutations of the foregoing. In general, any distribution system that provides multimedia presentations to a user for viewing may utilize the embodiments described herein.

The system of FIG. 1 may include at least one receiver 120 configured to provide a user with an interface to the system. In general, the receiver 120 of the system may receive an encrypted signal and convert it into a signal that a display or other compatible device may recognize and manipulate in order to present the multimedia presentation to one or more users. Further, the receiver 120 may provide the converted signal to a display device, such as a television or computer screen, for display to the user. In one implementation, the receiver 120 may receive the encrypted signal from a satellite 140 or through a digital cable or network connection. Further, in the satellite and digital cable configurations, the encrypted signal may be generated by a head-end 150 and transmitted to the receiver 120. Generally, the head-end 150 may be a master facility that receives programming signals for processing and distribution to various systems. In a satellite television provider, the head-end 150 may transmit the audio/visual signal to a satellite 140 for redistribution to end users, for example, subscribers to a satellite or cable television distribution system. Upon receipt, the satellite 140 may transmit the signal to an dish antenna 130 connected to the receiver 120 for decryption.

In a cable system configuration, the head-end 150 may transmit the multimedia signal directly to the receiver 120 over a cable network connection. For example, the signal may be provided to the receiver 120 through a wired system connected, directly or indirectly, between the receiver 120 and the head-end 150. Alternatively, the signal may be provided over a network 180 connection, utilizing for example a modem 160 associated with the receiver 120.

Additionally, the head-end 150 may utilize the network 180 to provide other communication signals to the receiver 120. For example, the head-end 150 may utilize the network 180, the satellite 140 or other telecommunications connections to provide programming updates to the receiver 120. Similarly, the receiver 120 may communicate information to the head-end 150 or to other networked devices. For example, the receiver may generate an instruction and/or information received at the head-end, within the network 180 or otherwise. In one implementation, the network 180 may be the Internet such that the signals transmitted over the network may include an Internet protocol (IP) address and may take the form of standardized packets of information for proper routing. In addition, the network may include and/or utilize various communication and networking topologies such as wireless, for example, WiFi, Bluetooth, WiMax, 3G, 4G and the like, and/or wired, such as a telephone system, LAN, WLAN, and the like, and/or any other known or hereinafter developed method to connect to the Internet.

In one embodiment, the receiver 120 may be a set-top box ("STB") for a satellite distribution system. However, although the terms "receiver" and "satellite system," or variants thereof, are used throughout this document, it should be understood that other hardware and/or networks may be used for example, one embodiment may employ a cable box and a cable network. Accordingly, the term "receiver" is intended to encompass other similar hardware, just as networks other than satellite systems are embraced by that term or the words "distribution network."

In addition, the system may also include a repeater device 190 in communication with the receiver 120 and the network 180. In general, the repeater device 190 may be configured to receive one or more multimedia presentations from the receiver and subsequently transmit said multimedia presentations to one or more mobile devices by transmitting the one or more presentations through the network 180. The configuration of the repeater device 190 is shown in more detail in FIG. 2. In some embodiments of the distribution system, the repeater device 190 may be integrated into the receiver 120 such that communication with the network 180 may occur through the receiver modem 160, as described above.

Figure 2:
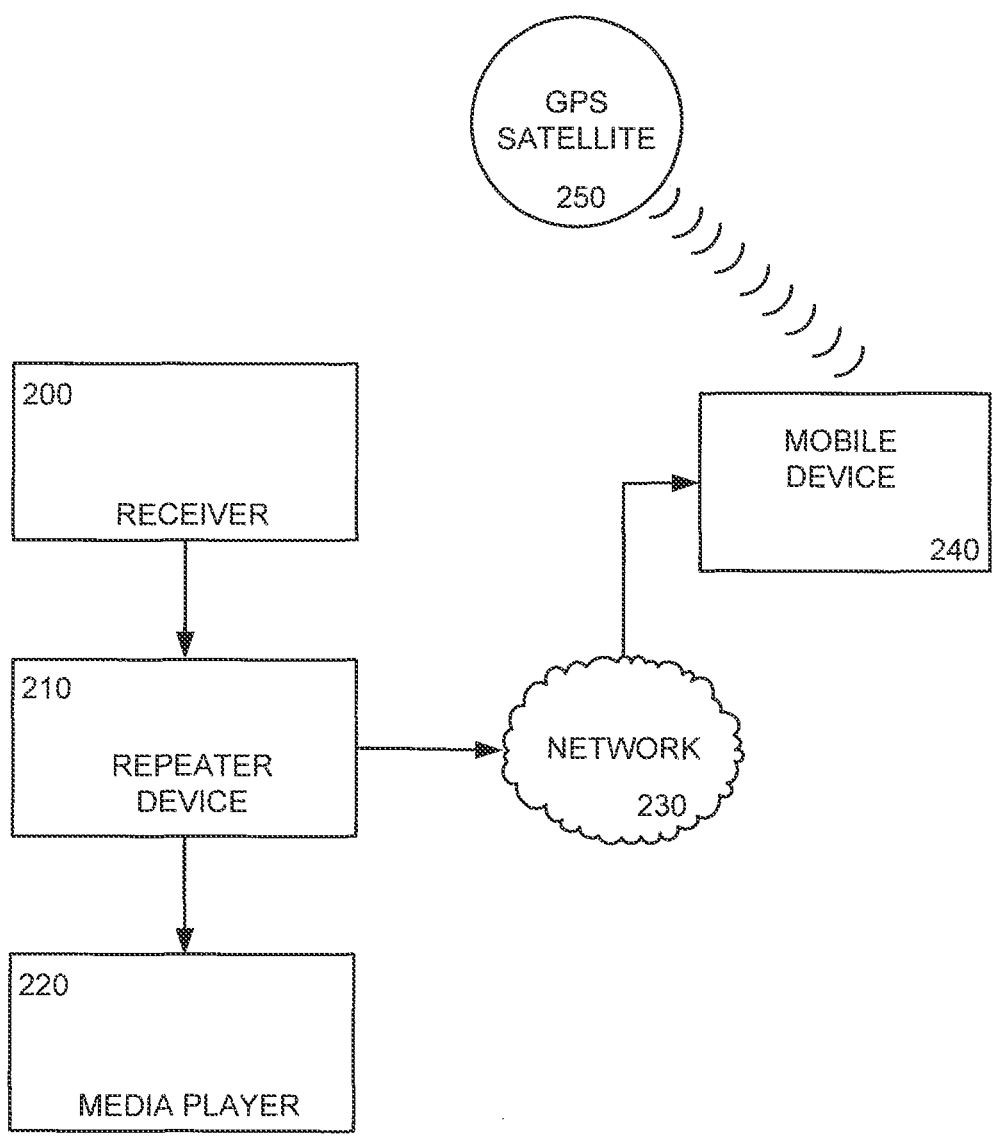
FIG. 2 depicts an exemplary distribution system that may utilize a repeater device to receive one or more multimedia presentations and provide the one or more multimedia presentations to a mobile device for display to a user.

FIG. 2 depicts an exemplary distribution system that may utilize a repeater device 210 to receive one or more multimedia presentations and provide the one or more presentations to a mobile device 240 for display to a user. In general, the receiver 200 and repeater device 210 of FIG. 2 are similar to the corresponding devices described above with reference to FIG. 1. Also, the network 230 of FIG. 2 may be similar to the network of FIG. 1, such that the network may include and/or utilize various communication and networking topologies as discussed above.

As explained above, the repeater device 210 may receive one or more multimedia presentations from the receiver 200. In turn, the repeater device 210 may be configured to provide the received presentations to one or more electronic devices in communication with the repeater device 210. For example, a media player 220 (such as a digital video recorder, a digital video disc player, a computing device, a video game system, a Blu-Ray player, and so on) may receive the one or more presentations from the repeater device 210 for display to a user of the media player. In one embodiment, the media player may be a digital video recorder ("DVR") that may be contained within, or otherwise connected to, the receiver 200 and/or the repeater device 210. Generally, a DVR is a device that may record video and/or audio in a digital format to a disk drive or other storage medium within the device. Through the DVR, a user may record a television program to a memory medium so that the program may be viewed by the user at a more convenient time. In some cases, the memory medium may be a hard drive or flash device that is external to the receiver but configured to receive the digital information of the recorded program.

In addition, the repeater device 210 may also provide the one or more multimedia presentations to a mobile device 240 through a network 230 connection. In general, the mobile device 240 may be any electronic device in communication with a wireless network that may display a multimedia presentation to a user of the device. Examples of the mobile device 240 may be, but are not limited to, handheld computing devices, personal digital assistants, mobile telephones, notebook computers, personal media players (PMP), music or audio players (such as an MP3 player), a wide area network (WAN) device, a Bluetooth device and so on.

The mobile device 240 may also be configured to receive one or more signals from a global positioning system satellite 250. The GPS signals received may be utilized by the mobile device to determine a position of the mobile device. In general, the mobile device may receive positional signals from a number of different GPS satellites surrounding the Earth and use this information to calculate its position. In addition, some mobile devices 240 with GPS may also store locations and track progress of a mobile device in transit such that several locations and movement of the mobile device may be maintained by the mobile device. In this manner, the mobile device may display one or more of the multimedia presentations provided by the repeater device 210, all while maintaining the location and relative movement of the mobile device.

Additionally, the mobile device 240 may provide one or more control signals through the network 230 to the repeater device 210, the media player 220 and/or the receiver 200 to control one or more components of the distribution system. For example, the mobile device 240 may be configured to control the receiver 200 of the distribution system, such as to select a particular channel or presentation received by the receiver. In another example, the control signal may be transmitted to control a media player 220 such that a user of the mobile device 240 may access presentations stored thereon and request playback of a selected presentation. In addition, control signals may be used to pause or rewind playback of a presentation, as well as fast forward a recorded presentation. Also, a control signal may be transmitted from the mobile device 240 to the distribution system to command the receiver 200 or media player 220 to record a presentation. In general, the mobile device 240 may transmit any control signal to any component of the distribution system to access and/or control a presentation provided by the distribution system.

Figure 3:
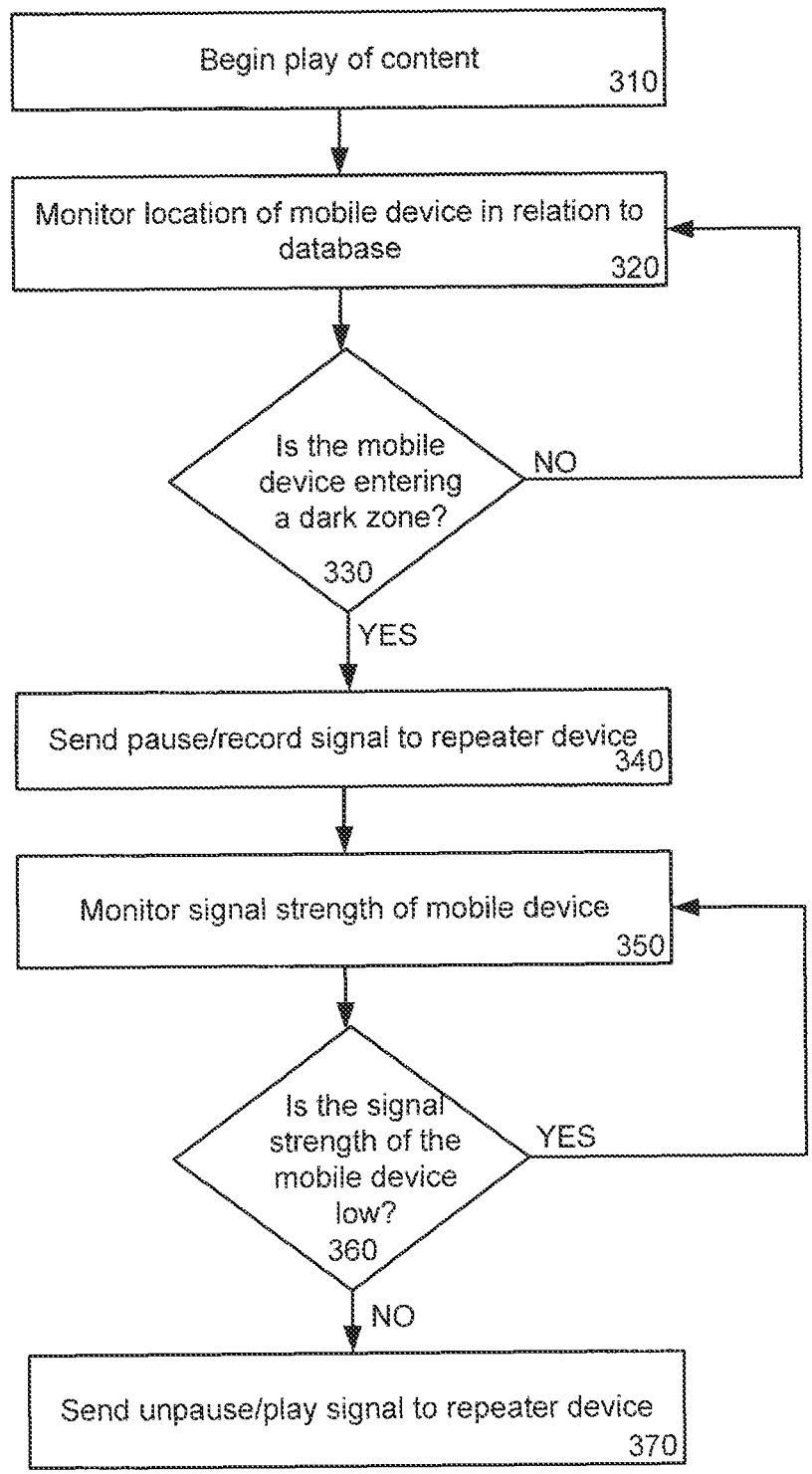
FIG. 3 is a flowchart depicting a method for a mobile device to pause or record one or more multimedia presentations when the wireless signal to the mobile device is degraded or lost.

As mentioned above, a mobile device 240 in transit may encounter zones in which the wireless signal (through which the one or more multimedia presentations may be provided to the mobile device) may become degraded or lost such that the presentation may no longer be received by the mobile device, or at least degraded in quality to such an extent that the presentation becomes unacceptable. As one example, streaming of the presentation across the wireless network may pause, stutter or simply cease. FIG. 3 is a flowchart depicting a method for a mobile device to pause or record one or more multimedia presentations when the wireless signal to the mobile device is degraded or lost. In general, the operations of the method of FIG. 3 may be executed by any mobile device receiving and displaying a multimedia presentation to a user of the device.

Beginning in operation 310, the mobile device may begin playing the received multimedia presentation. As described above, the mobile device may receive the multimedia presentation wirelessly across a network. Further, in some embodiments, the multimedia presentation may be transmitted to the mobile device from a repeater device in communication with a distribution system, as discussed above. In these embodiments, the repeater device may access the receiver of the distribution system to retrieve one or more multimedia presentations for transmission to the mobile device. Such presentations may be live or may be recorded by the receiver, such as on a DVR or other media player. Additionally, as explained above, the mobile device may be configured to control one or more components of the distribution system. Thus, a user may utilize the mobile device to select a presentation from the receiver or DVR, may pause or rewind a presentation, or may fast forward a stored presentation.

In operation 320, the mobile device may continually monitor the location of the mobile device using the GPS capabilities integrated into the mobile device. In addition, the mobile device may compare the GPS determined location of the device to a database of determined dark zones where the wireless signal received by the mobile device may be degraded or lost. As explained in more detail below, these areas may be determined locations where the wireless signal is below a threshold value. As should be appreciated, a degraded or lost wireless signal may affect the receiving and displaying of a multimedia presentation by the mobile device such that portions of the presentation may be missed or not displayed by the device.

While monitoring in operation 320, the mobile device may determine if the device is nearing or entering a dark zone as defined by the database in operation 330. The determination of operation 330 may occur in several manners. In one embodiment, the mobile device may simply compare the current location of the device to the database to determine if the device is within a determined dark zone. In another embodiment, the mobile device may determine a distance of the location of the device to the nearest dark zone to determine if the device is near the zone. For example, the mobile device may determine if the device is within one mile of a dark zone in any direction. In these embodiments, the mobile device (or a user thereof) may set a predetermined distance from the location of the mobile device to a dark zone to act as a threshold that indicates that the mobile device may be nearing a dark zone. This predetermined distance may be any distance down to the shortest distance determinable by the GPS components of the mobile device.

In yet another embodiment, the mobile device may maintain tracking information for a moving mobile device such that a path and/or speed of the moving device may be determined and analyzed by the mobile device to determine the proximity to a dark zone or the likelihood of the mobile device entering the dark zone. For example, the mobile device may monitor the GPS determined movements of the device to determine if the device is moving toward a dark zone at a particular speed. With this information, the mobile device may then estimate when (and/or the likelihood of) the device entering the dark zone and take the appropriate measures, described in more detail below. Thus, by monitoring and analyzing the movements of the mobile device, the device (or associated network) may estimate when the mobile device may be near a dark zone and lose the wireless signal. In general, the mobile device may utilize any information obtained from the GPS tracking and/or stored information to determine the estimate and likelihood that the device will encounter a dark zone, including heading, speed, topographical information of the area surrounding the mobile device position, predetermined routes (such as rail lines or roads that may indicate the mobile device will alter course prior to entering the dark zone) and the like.

If the mobile device determines in operation 330 that the mobile device is not near or likely to enter a dark zone, the mobile device may continue to monitor the location of the mobile device and compare said location to the database of dark zones (indicated in the flowchart by the return path to operation 320). Thus, the mobile device may continue to execute operations 320 and 330 to monitor the mobile device's location until the mobile device is near or within a dark zone. When the mobile device determines that the device is entering or near a dark zone (as determined in operation 330), the mobile device may then transmit a control signal to the network to communicate with one or more of the components of the distribution system in operation 340 to pause play of a multimedia presentation or record a portion of the presentation.

In general, the control signal transmitted in operation 340 from the mobile device may perform several functions. In one example, if the multimedia presentation being displayed by the mobile device is a live broadcast, the control signal may instruct the receiver or repeater device to pause play of the live broadcast. In another example, the control signal may instruct the receiver to provide the presentation to a media player, such as a DVR, for recording. In this example, the control signal (or a similar control signal) may also be routed to the media player to instruct the media player to record the multimedia presentation provided by the receiver. In yet another example, if the multimedia presentation being provide to and displayed by the mobile device is a recorded program, the control signal may be transmitted to the receiver or media player to pause playback of the recorded presentation. Similarly, multimedia presentations provided to the receiver as live streaming content may also be recorded on the media player. For example, the receiver may provide the live streaming content to the media player for storage when a lost or degraded signal is anticipated by the mobile device. In this manner, the a portion of the presentation may be retained by the distribution system such that the portion of the presentation may be provided to the mobile device when the device again receives an adequate wireless signal.

Once the control signal is transmitted by the mobile device to pause or record the multimedia presentation, the mobile device may begin monitoring the wireless signal strength of the mobile device in operation 350. As mentioned above, dark zones may be areas where the signal strength received by the mobile device is degraded or lost. Thus, in operation 350, the mobile device may determine the signal strength at the mobile device's location as a way of determining if the mobile device remains within a dark zone. This determination is illustrated in operation 360, wherein the mobile device may determine if the signal strength of the device is below a predetermined threshold. In general, the signal threshold value may be any signal strength as determined by the mobile device. In one example, the threshold value may be the lowest signal strength required for the mobile device to communicate with the network. In another example, the signal strength threshold may be a signal strength value sufficient to receive a multimedia presentation with minimal degradation of the presentation. Further, the threshold value may vary depending on the presentation being transmitted to the mobile device. Thus, a high definition presentation may require a higher threshold value than a lower definition presentation. Regardless of the threshold level, the receipt of a strong signal strength at the mobile device may indicate to the mobile device that the device has exited the dark zone and play of the presentation may resume.

If the mobile device determines in operation 360 that the signal strength of the mobile device remains below the predetermined threshold, the mobile device may continue to monitor the signal strength of the mobile device (as indicated in the flowchart by the return path to operation 350). Thus, the mobile device may continue to execute operations 350 and 360 to monitor the signal strength of the mobile device until a strong signal strength is received. Thus, if the mobile device determines in operation 360 that the signal strength has risen above the threshold level, a second control signal may be transmitted over the network to the distribution system in operation 370. In one embodiment, this second control signal may resume playback of the paused presentation such that display of the presentation on the mobile device may continue. In another embodiment, the second control signal may instruct the media player to provide the recorded presentation to the mobile device at the point of recording for display to a user. In yet another example, the second control signal may instruct the media player to provide the stored live streaming content such that no content is lost during a degraded signal. In this manner, the mobile device may determine when the signal of the device may be lost and pause display of the presentation such that no portion of the presentation is lost. In addition, the mobile device may begin displaying the presentation again upon exiting the dark zone at or near the point in the presentation when the signal may have been lost.

In another embodiment, the repeater device and/or the receiver may monitor the signal strength of the mobile device. In this embodiment, the repeater device and/or the receiver may perform operations 350 and 360. In addition, rather than providing signals generated by the mobile device to control the repeater and/or receiver, the repeater and/or receiver devices in this embodiment may automatically pause or record the program upon detection of a signal degradation or the nearing of the mobile device to a dark zone. Further, the repeater device and/or receiver may resume play of the multimedia presentation upon detection of a viable signal at the mobile device. In general, any device of the distribution system may perform one or more operations of the method of FIG. 3 to meet the capabilities of the system devices.

Figure 4:
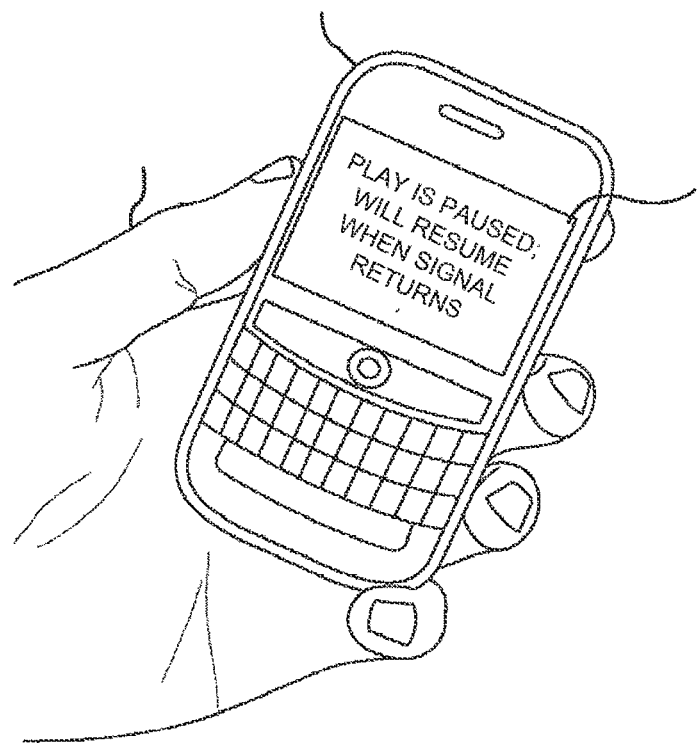
FIG. 4 depicts an exemplary mobile device for viewing a multimedia presentation, including an information message providing the status of a playback of the presentation to a user.

As should be appreciated, the method outlined in the flowchart of FIG. 3 may pause a multimedia presentation being displayed on the mobile device when the wireless signal strength is degraded or lost. FIG. 4 depicts an exemplary mobile device for viewing a multimedia presentation, including an informational message displayed on the device providing the status of the playback of the presentation to a user. In general, the mobile device may display any image or no image on the display of the mobile device during the pause period. For example, in FIG. 4, the mobile device may display a message to the user of the mobile device indicating that the multimedia presentation is paused and will begin playing when a strong signal strength is measured. In another example, the display may simply show the paused presentation until the mobile device exits the dark zone and play resumes.

As mentioned above with reference to operation 320 of FIG. 3, the mobile device may compare the location of the mobile device to a database of dark zones where signal strength received by the mobile device may be degraded or lost. In general, the database may take any form of information that may define one or more locations or areas where signal strength may be low or lost. The database may be stored in any computer-readable medium that is accessible by the mobile device. For example, the database may be maintained on a computer-readable medium within the mobile phone. In another example, the database may be stored within the network and accessible by the mobile device. Regardless of the location of the database, the information contained within the database may be utilized by the mobile device to define the dark zones for that device.

To define the dark zones for the mobile device, the database may take many forms. In one embodiment, the database may comprise a listing of latitude and longitudes that define points where the mobile device has experienced a degraded or lost signal. In use, the list of latitudes and longitudes may be compared to the current location of the mobile device to determine if the mobile device is near or within a dark zone. In addition, a suspect area around each listed location may be created within the database such that a dark zone may include the identified location and the area surrounding the location. For example, the dark zone may be defined by the database as the lat/long location and a circular area of 20 feet surrounding the location. The suspect area, however, may take any shape and be of any size to define the dark zone.

Another embodiment of the database may define the dark zones through a plurality of locations that mark out the outer edge of the dark zones. For example, the database may maintain a plurality of locations comprising latitudes and longitudes, as described above. However, rather than being stand-alone locations, a collection of such locations may form vertices of a dark zone area. In one embodiment, the database may identify at least three location points near each other and extrapolate a line connecting the at least three location points. Through this, the database may define any location within the connected points as a dark zone. Similarly, four location points, five location points and so on may also be connected to define a dark zone within the connected points.

Regardless of how the dark zones are defined, the database may be provided to the mobile device in several ways. In one embodiment, the dark zone definitions may be provided to the mobile device from a external source. For example, the mobile device carrier may provide the dark zones to the mobile device by communicating the locations through the network to the device. In another example, the database may be provided directly the mobile device by a user through an input device associated with the mobile device. In yet another example, described in more detail below with reference to FIG. 5, the mobile device may generate the database automatically during use of the device.

In addition, the dark zone locations within the database may be populated in several manners. In one example, the database may be created by a mobile device carrier based on network information and provided to the mobile device. In another example, the database may be populated by one or more users to locate the dark zones, such as by adding dark zones to an interactive map feature accessed through the Internet or through the mobile device. This database may be made available to several mobile device users such that the dark zones may be created collaboratively by multiple users of the network. In yet another embodiment described in more detail below with reference to FIG. 5, the mobile device may automatically collect one or more dark zone locations. Further, the database may be created through a combination of any manner described herein to gather a larger number of dark zone locations.

Figure 5:
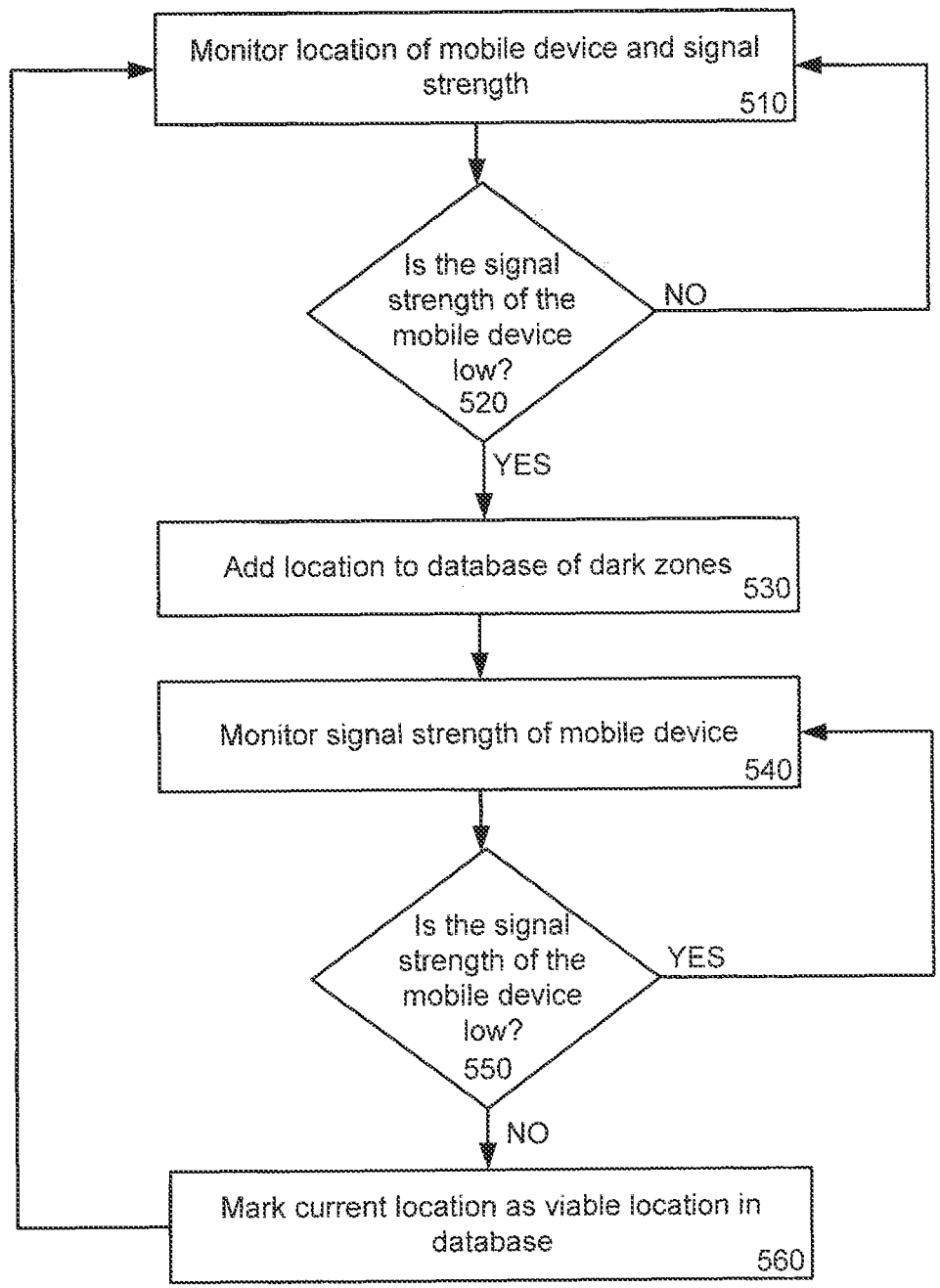
FIG. 5 is a flowchart depicting a method for a mobile device to determine and store locations where a wireless signal to the mobile device is degraded or lost for use in pausing a multimedia presentation on the mobile device.

FIG. 5 is a flowchart depicting a method for a mobile device to determine and store locations where the wireless signal to the mobile device is degraded or lost for use in pausing a presentation of the a multimedia presentation on the mobile device. The operations of FIG. 5 may be performed by any mobile device for the purpose of creating a dark zone database. Further, such information may be shared among several mobile devices and/or utilized by the mobile device to determine the proximity of the dark zone to the mobile device.

Beginning in operation 510, the mobile device may monitor the signal strength of the mobile device as well as the current location of the device. As explained above, the mobile device may utilize GPS capability of the mobile device to determine the device's location. Similarly, the mobile device may also monitor the wireless signal strength being received by the mobile device from the network. Further, in operation 520, the mobile device may determine if the signal strength of the mobile device is below a predetermined threshold. In general, the signal threshold may be any signal strength as determined by the mobile device. For example, the threshold may be the lowest signal strength required for the mobile device to communicate with the network. In another example, the signal strength threshold may be a signal strength sufficient to receive a multimedia presentation with minimal degradation of the presentation. Regardless of the threshold level, the receipt of a strong signal strength at the mobile device may indicate that the mobile device has exited the dark zone.

If it is determined in operation 520 that the signal strength is not below the threshold level, the mobile device may continue to monitor the signal strength of the device (illustrated in the flowchart of FIG. 5 by the arrow returning to operation 510). In this manner, the mobile device may continually monitor the signal strength and location of the mobile device until a low signal is detected. Once a low signal is detected, the mobile device may add the location of the mobile device where the low signal is detected to the database of dark zones in operation 530. Such a location may be added to the database by adding the latitude and longitude of the mobile device at the time of low signal detection.

The mobile device may then continue to monitor the signal strength of the mobile device in operation 540. As should be appreciated, the mobile device may have no signal at this point such that the location of the mobile device may not be attainable. Further, the mobile device may continue to have no or little signal strength while the device is in the dark zone. For example, the mobile device may be in a tunnel such that no signal is received by the mobile device for several seconds or minutes. Thus, in operation 550, the mobile device may determine if the signal strength remains below the predetermined threshold value. As long as the signal strength remains low, the mobile device may continue to monitor the signal strength, illustrated by the return path to operation 540. However, if the mobile device determines in operation 550 that the signal strength no longer remains low, the mobile device may note the location of the mobile device when the signal strength returned in operation 560. This information may be utilized by the mobile device to define a dark zone spanning several locations. For example, the mobile device may extrapolate a line from the location noted in operation 530 to the location noted in operation 560 and establish a dark zone along the extrapolated line.

Upon noting the location of renewed signal strength, the mobile device may return to monitoring the location and signal strength of the device by returning to operation 510. In this manner, the mobile device may continually monitor and note dark zones for addition into the database. In addition, the detected dark zone locations may be provided to several other devices, as explained above.

It should be noted that the flowcharts of FIGS. 3 and 5 are illustrative only. Alternative embodiments may add operations, omit operations, or change the order of operations without affecting the spirit or scope of the present invention.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to: a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

The foregoing merely illustrates certain principles and embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the embodiments and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method for receiving a transmission on a mobile device, the method comprising:
   monitoring, by the mobile device, a location of the mobile device;
   comparing the monitored location of the mobile device with at least one location of a degraded signal to anticipate a potential degradation of signal to the mobile device; and
   transmitting, by the mobile device without user input to a physically separate television receiver, a control signal to pause the transmission to the mobile device and record the transmission at a distribution system.

2. The method of claim 1, further comprising:
   receiving the transmission from the distribution system; and
   displaying the transmission on a display of the mobile device.

3. The method of claim 1, wherein the monitoring operation comprises:
   receiving one or more global positioning system (GPS) signals from a GPS satellite; and
   analyzing the one or more GPS signals to determine the location of the mobile device.

4. The method of claim 1, further comprising:
   monitoring signal strength received by the mobile device; and
   transmitting a subsequent control signal when the signal strength exceeds a threshold signal level, wherein the subsequent control signal resumes play of the transmission on the display of the mobile device.

5. The method of claim 1, wherein the comparing operations comprises:
   determining whether the location of the mobile device is within a predetermined distance to the at least one location of a known degraded signal.

6. The method of claim 1, further comprising:
   maintaining tracking information for the mobile device; and wherein the comparing operations comprises:
   analyzing the tracking information; and
   determining the likelihood that the location of the mobile device will near one of the at least one location of a known degraded signal.

7. The method of claim 1, wherein the transmitting operation comprises utilizing a wireless network to transmit the control signal to a multimedia distribution system.

8. The method of claim 1, wherein the transmission is a multimedia presentation.

9. A non-transitory computer-readable medium of a mobile device having sets of instructions stored thereon which, when executed by a computer, cause the computer to:
   monitor, by the mobile device, a location of the mobile device;
   compare the monitored location of the mobile device with at least one location of a degraded signal to anticipate a potential degradation of signal to the mobile device; and
   transmit automatically, by the mobile device to a physically separate television receiver, a control signal to pause a transmission to the mobile device and record the transmission at a distribution system.

10. The non-transitory computer-readable medium of claim 9, wherein the sets of instructions, when further executed by the computer, cause the computer to:
    receive the transmission from the distribution system; and
    display the transmission on a display of the mobile device.

11. The non-transitory computer-readable medium of claim 9, wherein the monitoring operation comprises:
    receiving one or more global positioning system (GPS) signals from a GPS satellite; and
    analyzing the one or more GPS signals to determine the location of the mobile device.

12. The non-transitory computer-readable medium of claim 9, wherein the sets of instructions, when further executed by the computer, cause the computer to:
    monitor signal strength received by the mobile device; and
    transmit a subsequent control signal when the signal strength exceeds a threshold signal level, wherein the subsequent control signal resumes play of the transmission on the display of the mobile device.

13. The non-transitory computer-readable medium of claim 9, wherein the comparing operations comprises:
    determining whether the location of the mobile device is within a predetermined distance to the at least one location of a known degraded signal.

14. The non-transitory computer-readable medium of claim 9, wherein the sets of instructions, when further executed by the computer, cause the computer to:
    maintain tracking information for the mobile device; and wherein the comparing operations comprises:
    analyze the tracking information; and
    determine the likelihood that the location of the mobile device will near one of the at least one location of a known degraded signal.

15. A system for receiving a transmission on a mobile device, the system comprising:
- a memory device; and
- a computer processor in communication with the memory device which has sets of instructions stored thereon which, when executed by the computer processor, cause the computer processor to:
- monitor, by the mobile device, a location of the mobile device;
- compare the monitored location of the mobile device with at least one location of a degraded signal to anticipate a potential degradation of signal to the mobile device; and
- transmit, by the mobile device to a physically separate television receiver, a control signal to pause the transmission to the mobile device and record the transmission at a distribution system.

16. The system of claim 15, wherein the sets of instructions, when further executed by the computer processor, cause the computer processor to:
- receive the transmission from the distribution system; and
- display the transmission on a display of the mobile device.

17. The system of claim 15, wherein the monitoring operation comprises:
- receiving one or more global positioning system (GPS) signals from a GPS satellite; and
- analyzing the one or more GPS signals to determine the location of the mobile device.

18. The system of claim 15, wherein the sets of instructions, when further executed by the computer processor, cause the computer processor to:
- monitor signal strength received by the mobile device; and
- transmit a subsequent control signal when the signal strength exceeds a threshold signal level, wherein the subsequent control signal resumes play of the transmission on the display of the mobile device.

19. The system of claim 15, wherein the sets of instructions, when further executed by the computer processor, cause the computer processor to:
- maintain tracking information for the mobile device; and
- wherein the comparing operations comprises:
- analyze the tracking information; and
- determine the likelihood that the location of the mobile device will near one of the at least one location of a known degraded signal.

20. The system of claim 15, wherein the transmission is a multimedia presentation.

* * * * *